No. 628,370. Patented July 4, 1899.
P. TEMPEST.
STRAP FASTENING.
(Application filed May 19, 1898.)
(No Model.)
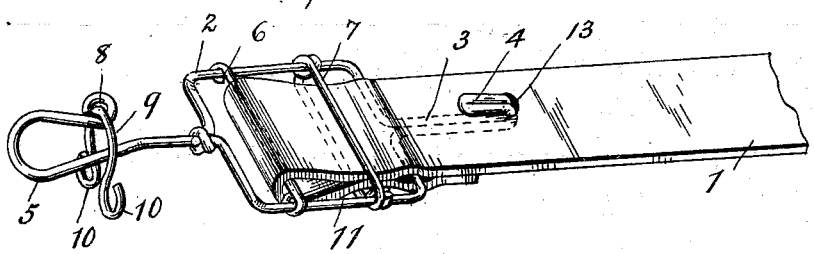
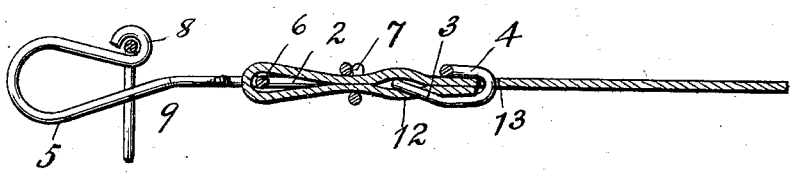
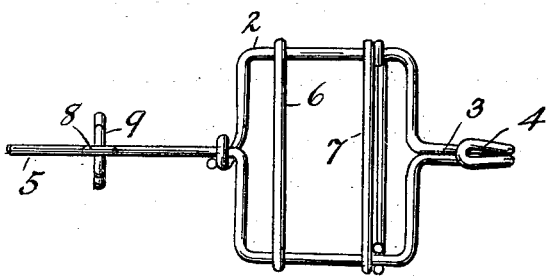 
Witnesses
Sand R. Turner
Chas. S. Hyer
Inventor
Phineus Tempest.
By R. S. & A. B. Lacey,
Attorneys.

UNITED STATES PATENT OFFICE.

PHINEUS TEMPEST, OF REXBURG, IDAHO.

STRAP-FASTENING.

SPECIFICATION forming part of Letters Patent No. 628,370, dated July 4, 1899.

Application filed May 19, 1898. Serial No. 681,149. (No model.)

*To all whom it may concern:*

Be it known that I, PHINEUS TEMPEST, a citizen of the United States, residing at Rexburg, in the county of Fremont and State of Idaho, have invented certain new and useful Improvements in Harness Attachments; and I do hereby declare the following to be a full, clear, and exact description of the invention, such as will enable others skilled in the art to which it appertains to make and use the same.

This invention relates to harness attachments, and particularly to a buckle adapted especially for attachment to strap ends; and it consists, essentially, of a buckle-frame, preferably made of wire and having cross-binding bars, a rear hook, and a forwardly-projecting snap-hook member carrying a loose gravitating closing loop.

The invention further consists of the details of construction and arrangement of the several parts, which will be more fully hereinafter described and claimed.

The object of the invention is to provide a buckle adapted particularly for attachment to strap ends and combining therewith a snap-hook which is easily operated and thereby rendered convenient for use in making attachments in cold weather when the hands of the operator are stiff and the manipulation of general harness attachments thereby rendered exceedingly difficult.

In the accompanying drawings, Figure 1 is a perspective view of a portion of a strap, showing the improved buckle and the parts thereof applied thereto. Fig. 2 is a longitudinal vertical section of the device shown by Fig. 1. Fig. 3 is a top plan view of the improved buckle. Fig. 4 is a detail view of the gravitating loop used in connection with the snap-hook attachments of the buckle.

Referring to the drawings, wherein similar numerals of reference are employed to indicate corresponding parts in the several views, the numeral 1 designates a strap, which may be a rein or any other connecting part of harness, which is adapted to be attached or detached in harnessing or unharnessing a horse or other animal. The buckle comprises a substantially rectangular frame 2, having a rear shank 3, terminating in a hook 4, and a front snap-hook member 5, all of the said parts being preferably integral and constructed from a single piece of wire. Adjacent the front end of the frame 2 a transverse stay-bar 6 is secured in position, and in rear of the same is a double clamping-bar 7, the said stay and clamping bars being attached to the opposite side bars of the said frame. The clamping-bar 7 is also preferably made of a single piece of wire and comprises upper and lower members spaced apart from each other. The snap-hook member is deflected downwardly, as shown in Fig. 1, and then returned and terminates in an eye 8, in which a substantially U-shaped gravitating loop 9 is loosely mounted, and has its free ends bent into stop-loops 10, which prevent separation of the said gravitating loop from the snap-hook member. The gravitating loop 9 swings freely in the eye 8 and has inherent resiliency, which permits the lower parts thereof to spring over the wire of which the snap-hook member is formed either at the rear or front in attaching or detaching the snap-hook; but when the said snap-hook is placed in engagement with a receiving device the said gravitating loop will offer sufficient resistance to prevent accidental disengagement of the snap-hook. As clearly illustrated in Figs. 1 and 2, the said gravitating loop covers the throat of the snap-hook, and in operating the device the stop-loops 10 also serve as convenient grips.

In applying the buckle to a strap end the strap 1 is lapped, as at 11, and passed around the stay-bar 6. The opposite parts of the loop portion 11 are then unitedly drawn through the clamping-bar 7 and then passed over the rear bar of the frame 2. An opening 12 is formed near the terminating end of the strap, and through which the shank 7 is passed to hold the said end firmly against the body of the strap above, and the hook 4 is also passed through an opening 13 in the said main body of the strap. By this means the buckle is firmly attached to the strap without the use of stitches or other securing devices.

In applying the snap-hook member to a ring or other receiving device the gravitating loop 9 is thrown back and forced over an adjacent portion of the said member to clear the throat of the latter, and after the connection has been made the said loop is arranged in the position shown in Fig. 1 and swings loose in the eye 8.

The attachment is especially intended for rein ends and is convenient for use in cold weather, as there are no slides or springs to operate. The several parts can be ornamented by plating or otherwise, and changes in the dimensions, proportions, and minor details of construction could be resorted to for various applications without departing from the nature or spirit of the invention or sacrificing any of the advantages thereof.

Having thus described the invention, what is claimed as new is—

1. An attachment for a strap comprising a snap-hook having a yielding loop loosely mounted in the bill thereof and of substantial U shape with a contracted open portion adapted to be sprung apart and pass over portions of said hook.

2. A buckle having a body-frame with integral hook and snap-hook members respectively at the rear and front ends thereof, combined with a strap having a looped end engaging said body-frame and an opening therein through which the said rear hook member is adapted to pass to hold the strap intact with the body-frame without stitches or other fastenings.

In testimony whereof I affix my signature in presence of two witnesses.

PHINEUS TEMPEST.

Witnesses:
R. C. FRIST,
HYRUM RICKS.